June 4, 1946.  B. E. LUBOSHEZ  2,401,693
STEREOSCOPIC RANGE FINDER
Filed July 18, 1941
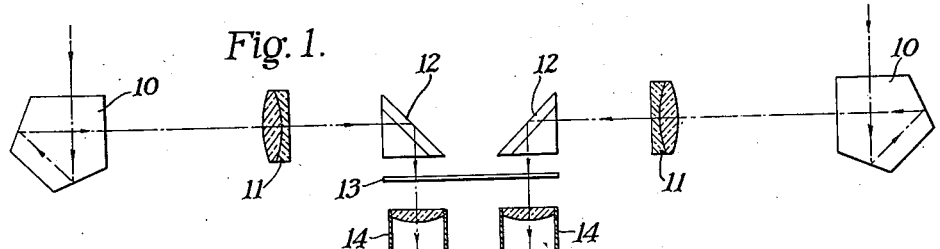
Fig. 1.
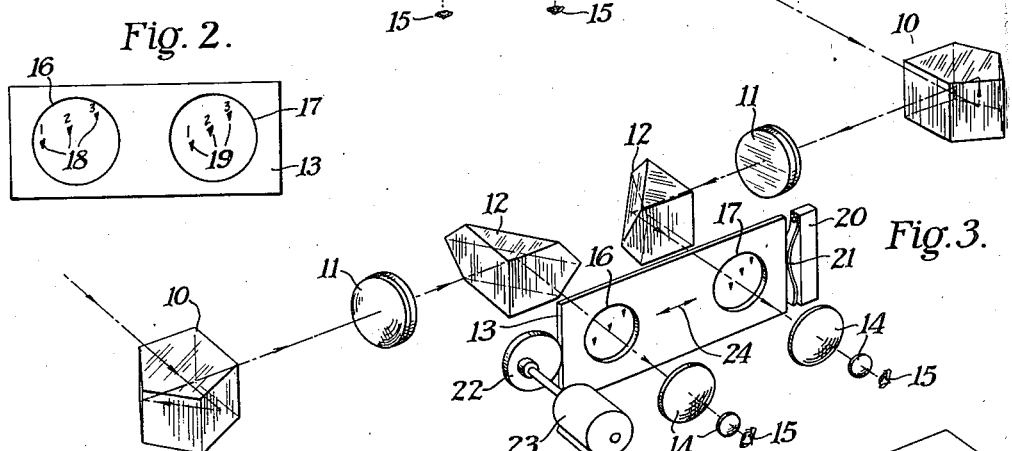
Fig. 2.
Fig. 3.
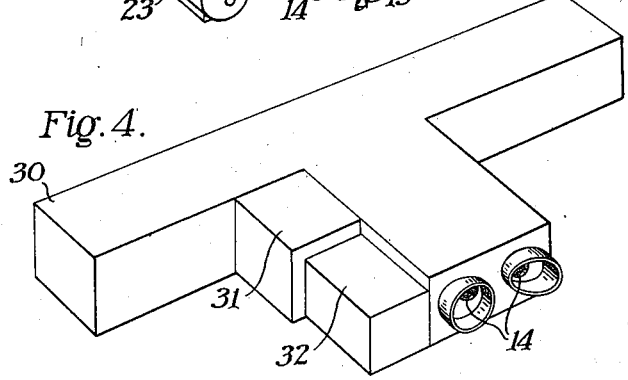
Fig. 4.
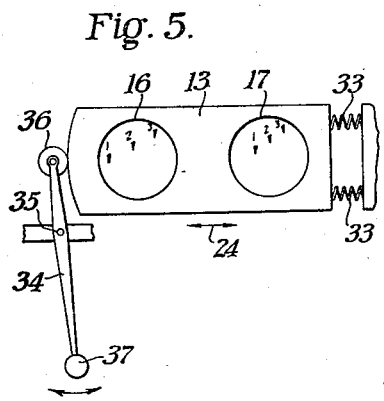
Fig. 5.
Benjamin E. Luboshez
INVENTOR
BY
ATTORNEY Patented June 4, 1946

2,401,693

UNITED STATES PATENT OFFICE 2,401,693

STEREOSCOPIC RANGE FINDER

Benjamin E. Luboshez, Rochester, N. Y., assignor to Eastman Kodak Company, Rochester, N. Y., a corporation of New Jersey Application July 18, 1941, Serial No. 402,987

5 Claims. (Cl. 88—2.6)

This invention relates to range finders and particularly to stereoscopic range finders.

It is an object of the invention to provide a stereoscopic range finder with which readings can be made with greater ease and greater accuracy.

With ordinary stereoscopic range finders, it has been observed that greater accuracy in range determination is obtained when they are used on moving rather than upon stationary targets. This is because it is easier to determine when two objects are at the same distance away from the observer when one of them has a transverse movement relative to the other than when both are stationary.

According to the present invention both of the stereoscopic graticules in the eyepieces of the range finder are given equal translatory movements, preferably a slow vibration in a horizontal plane, so that there is relative movement between the stereoscopic scales and the fixed target image. There is, of course, no movement along the line of sight, i. e., no movement in depth, but only a slow movement back and forth across the field so as to make it more easy to identify the position at which the target cuts through the stereoscopic scale. A more complicated arrangement for obtaining this relative movement (and for other purposes) is described in my copending application Serial No. 402,984, filed concurrently herewith in which the graticules are held stationary and the image is shifted by shifting the viewpoint. The shifting graticules may also be applied to the moving viewpoint range finders, described in that copending application.

An incidental advantage of any form of the invention is that the numbering on the scales, which frequently cannot easily be deciphered in ordinary stereoscopic range finders when covered by parts of the target, moves in and out of view, a result usually obtainable only by moving the whole instrument.

Other objects and advantages of the invention will be apparent from the following description thereof when read in connection with the accompanying drawing in which:

Fig. 1 is a horizontal section of a stereoscopic range finder.

Fig. 2 shows an arrangement for carrying both sets of stereoscopic graticules on a single plate.

Fig. 3 is a perspective view of one embodiment of the invention with the housing removed.

Fig. 4 is a perspective view of the same embodiment showing the outside.

Fig. 5 shows an alternative arrangement for providing graticule movement.

In Fig. 1 two viewpoints of a stereoscopic range finder are provided by pentagon prisms 10 which reflect the light to objectives 11 and roof prisms 12 and to eyepieces 14 behind which the two eyes 15 of the observer may be positioned. The eyepieces 14 are at interocular separation and are preferably adjustable to accommodate different observers. In the focus planes of the objectives 11, which are also the focus planes of the eyepieces 14 stereoscopic graticules are stereoscopically arranged on a transparent plate 13. A front view of this plate 13 is shown in Fig. 2 in which the two fields 16 and 17 respectively include stereoscopic graticule rulings 18 and 19 stereoscopically arranged, with the scale printed adjacent to the rulings or markings. When the separation of the eyepieces 14 is adjustable, the separation of the graticules 16 and 17 should be similarly adjustable.

According to the invention as shown in Fig. 3 the plate 13 is given transverse back-and-forth movement as indicated by double-headed arrow 24. One end of the plate 13 is resiliently held out from a support 20 by a spring 21. The other end is engaged by a cam 22 driven by a motor 23. As the cam 22 rotates, the plate 13 moves back and forth under the action of the spring 21.

The housing for this instrument is shown in Fig. 4, the main part being in the box 30, the cam 22 being in the box 31 and the motor 23 being in the box 32.

An alternative arrangement which is most convenient for providing the slow back-and-forth movement of the plate 13 is shown in Fig. 5. In this case one end of the plate is held against springs 33 and the other end is in contact with the wheel 36 mounted on the upper end of a pendulum 34 pivoted at the point 35 and having a weight 37 at its lower end. In practice the observer takes an ordinary stereoscopic reading and then starts the pendulum 34 swinging to give the graticules a back-and-forth movement over the object whose range is being checked. Other observers find it easier to make all readings with the graticules moving slowly back anad forth. Alternatively the weight 37 is eliminated and the movement provided by a spiral spring like the balance wheel of a clock.

The principle of this invention may be applied to all stereoscopic range finders even those with a single pair of marks or rulings which are adjustable in apparent depth. In this latter case the back-and-forth movement is quite independent of the depth adjustment. It may also be applied to the moving viewpoint type of range finder described in my copending application, Serial No. 402,984, filed concurrently herewith but it is not so necessary in that case since with the moving viewpoint range finder, the image of the object whose range is to be found can be given a back-and-forth movement in the image plane and the graticules held stationary, thus employing the same invention (relative movement of image and graticule) for providing ease and accuracy in stereo ranging.

Having thus described the preferred embodiments of my invention, I wish to point out that it is not limited to these but is of the scope of the appended claims.

What I claim and desire to secure by Letters Patent of the United States is:

1. A stereoscopic range finder comprising a housing, two eyepieces carried by the housing at interocular separation, means in the housing for forming in the focus planes of the eyepieces and from spaced viewpoints, images of the object whose range is to be found, stereoscopic graticules stereoscopically positioned in the focus planes and means carried by the housing for moving the graticules simultaneously and transversely without altering the stereoscopic relation.

2. A range finder according to claim 1 in which the graticules for both image planes are carried by a single laterally disposed plate and the moving means operates on said plate.

3. A range finder according to claim 1 in which the moving means is reciprocating for giving a back-and-forth movement to the graticules.

4. A range finder according to claim 1 in which the moving means includes a pendulum for providing a back-and-forth movement to the graticules.

5. A stereoscopic range finder comprising a housing, two eyepieces carried by the housing at interocular separation, means in the housing for forming in the focus planes of the eyepieces and from spaced viewpoints, images of the object whose range is to be found, stereoscopic graticules stereoscopically positioned in the focus planes and means carried by the housing for giving transverse relative movement between the image and graticules without altering the stereoscopic relation of the graticules.

BENJAMIN E. LUBOSHEZ.